United States Patent
Kang et al.

(10) Patent No.: US 12,517,611 B2
(45) Date of Patent: Jan. 6, 2026

(54) DISPLAY DEVICE, METHOD OF DETERMINING DRIVING FREQUENCY, AND METHOD OF DRIVING THE DISPLAY DEVICE

(71) Applicant: Samsung Display Co., Ltd., Yongin-Si (KR)

(72) Inventors: Bongil Kang, Yongin-si (KR); Minhong Kim, Yongin-si (KR); Sangkook Kim, Yongin-si (KR); Yerin Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/909,946

(22) Filed: Oct. 9, 2024

(65) Prior Publication Data
US 2025/0123706 A1 Apr. 17, 2025

(30) Foreign Application Priority Data
Oct. 17, 2023 (KR) .................. 10-2023-0138926

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC ... G06F 3/04166; G06F 3/0418; G06F 3/0446
See application file for complete search history.

(56) References Cited

U.S. PATENT DOCUMENTS

| | | | |
|---|---|---|---|
| 10,042,470 B2 | 8/2018 | Shin et al. | |
| 2013/0234985 A1* | 9/2013 | Huang | G06F 3/0446 345/174 |
| 2014/0152612 A1* | 6/2014 | Choi | G06F 3/044 345/174 |
| 2016/0077497 A1* | 3/2016 | Bovet | G06F 3/044 368/69 |
| 2020/0326815 A1* | 10/2020 | Choi | G06F 3/04184 |
| 2020/0393949 A1* | 12/2020 | Kim | G06F 3/0446 |
| 2021/0184675 A1* | 6/2021 | Yamada | G06F 3/044 |
| 2023/0289010 A1* | 9/2023 | Ichikawa | G06F 3/04166 |

FOREIGN PATENT DOCUMENTS

| | | |
|---|---|---|
| JP | 5890664 B2 | 3/2016 |
| KR | 10-2014-0071049 A | 6/2014 |
| KR | 10-2017-0119282 A | 10/2017 |
| KR | 10-2521410 B1 | 4/2023 |

* cited by examiner

*Primary Examiner* — Md Saiful A Siddiqui
(74) *Attorney, Agent, or Firm* — Innovation Counsel LLP

(57) ABSTRACT

A display device is disclosed that includes a display panel displaying an image, a display driving portion configured to drive the display panel, a touch unit disposed on the display panel and including a driving electrode and a sensing electrode, a touch driving portion configured to transmit a touch driving signal to the driving electrode and receive a touch sensing signal from the sensing electrode, and a main processor configured to control the display driving portion and the touch driving portion, in which a driving frequency of the touch driving signal is determined based on an amount of change in touch capacitance due to an external input, with respect to touch capacitance between the driving electrode and the sensing electrode.

19 Claims, 10 Drawing Sheets

DISPLAY DEVICE, METHOD OF DETERMINING DRIVING FREQUENCY, AND METHOD OF DRIVING THE DISPLAY DEVICE

CROSS-REFERENCE TO RELATED APPLICATION

This application is based on and claims priority under 35 U.S.C. § 119 to Korean Patent Application No. 10-2023-0138926, filed on Oct. 17, 2023, in the Korean Intellectual Property Office, the disclosure of which is incorporated by reference herein in its entirety.

BACKGROUND

1. Field

One or more embodiments relate to a display device, a method of determining a driving frequency, and a method of driving the display device.

2. Description of the Related Art

Touch panels are input devices for inputting commands by a user selecting instructions displayed on a screen of an image display device using their hand or an object. To this end, a touch panel is provided in an image display device to convert the point of direct contact with a user's hand or object into an electrical signal. Accordingly, the instructions selected at the point of contact are accepted as input signals. As touch panels may replace other input devices such as a keyboard or a mouse, the range of use of touch panels is expanding.

A touch panel implementation method may include a resistive method, a light sensing method, and an electrostatic capacitive method. In a touch panel using an electrostatic capacitive method, a touch location may be determined by detecting a change in capacitance that occurs when a user's hand or object touches the location.

SUMMARY

One or more embodiments include a method of determining a driving frequency to prevent touch malfunctions in a low temperature environment, a display device, and a method of driving the display device. However, this is an example, and the scope of the disclosure is not limited thereby.

Additional aspects will be set forth in part in the description which follows and, in part, will be apparent from the description, or may be learned by practice of the presented embodiments of the disclosure.

According to one or more embodiments, a display device includes a display panel displaying an image, a display driving portion configured to drive the display panel, a touch unit disposed on the display panel and including a driving electrode and a sensing electrode, a touch driving portion configured to transmit a touch driving signal to the driving electrode and receive a touch sensing signal from the sensing electrode, and a main processor configured to control the display driving portion and the touch driving portion, in which a driving frequency of the touch driving signal is determined based on the amount of change in touch capacitance due to an external input with respect to touch capacitance between the driving electrode and the sensing electrode.

In an embodiment, the driving frequency may be determined within a frequency range in which a ratio of the amount of change in touch capacitance to the touch capacitance is greater than or equal to a preset ratio.

In an embodiment, the preset ratio may be 8.6%.

In an embodiment, the driving frequency may be about 200 kHz to about 465 kHz.

In an embodiment, the driving frequency may be determined as a frequency that is the same as or less than a frequency at which a ratio of the amount of change in touch capacitance to the touch capacitance corresponding to a preset ratio.

In an embodiment, the touch unit may be of an electrostatic capacitive type.

In an embodiment, the touch unit may be of a mutual electrostatic capacitive type.

In an embodiment, the touch driving portion may be further configured to apply the touch driving signal having the driving frequency to the touch unit, in response to a control signal received from the main processor.

In an embodiment, the touch driving portion may be further configured to calculate coordinate information of an input based on the touch sensing signal received from the touch unit and provide a coordinate signal having the coordinate information to the main processor.

According to one or more embodiments, a method of determining a driving frequency of a touch driving signal in a display device including a display panel and a touch unit, the touch driving signal being transmitted to the touch unit, includes obtaining across a range of frequencies, data on touch capacitance between a driving electrode and a sensing electrode, the driving electrode and the sensing electrode being included in the touch unit, obtaining, for each frequency, data on an amount of change in touch capacitance when an external input is applied to the touch unit, and determining a driving frequency of the touch driving signal based on a ratio of the touch capacitance change to the touch capacitance.

In an embodiment, the driving frequency may be determined within a frequency range in which a ratio of an amount of change in touch capacitance to the touch capacitance is greater than or equal to a preset ratio.

In an embodiment, the preset ratio may be 8.6%.

In an embodiment, the driving frequency may be about 200 kHz to about 465 kHz.

In an embodiment, the driving frequency may be determined as a frequency that is the same as or less than a frequency at which a ratio of an amount of change in touch capacitance to the touch capacitance corresponding to a preset ratio.

In an embodiment, the touch unit may be of an electrostatic capacitive type.

In an embodiment, the touch unit may be of a mutual electrostatic capacitive type.

According to one or more embodiments, a method of driving a display device including a display panel and a touch unit includes, obtaining, across a range of frequencies, data on touch capacitance between a driving electrode and a sensing electrode, the driving electrode and the sensing electrode being included in the touch unit, obtaining, for each frequency, data on an amount of change in touch capacitance when an external input is applied to the touch unit, determining a driving frequency of a touch driving signal transmitted to the touch unit based on a ratio of a capacitance change amount to the touch capacitance, and transmitting the touch driving signal having the driving frequency to the touch unit.

In an embodiment, the driving frequency may be determined within a frequency range in which a ratio of an amount of change in touch capacitance to the touch capacitance is greater than or equal to a preset ratio.

In an embodiment, the driving frequency may be determined as a frequency that is the same as or less than a frequency at which a ratio of an amount of change in touch capacitance to the touch capacitance corresponding to a preset ratio.

In an embodiment, the touch unit may be of an electro-static capacitive type.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
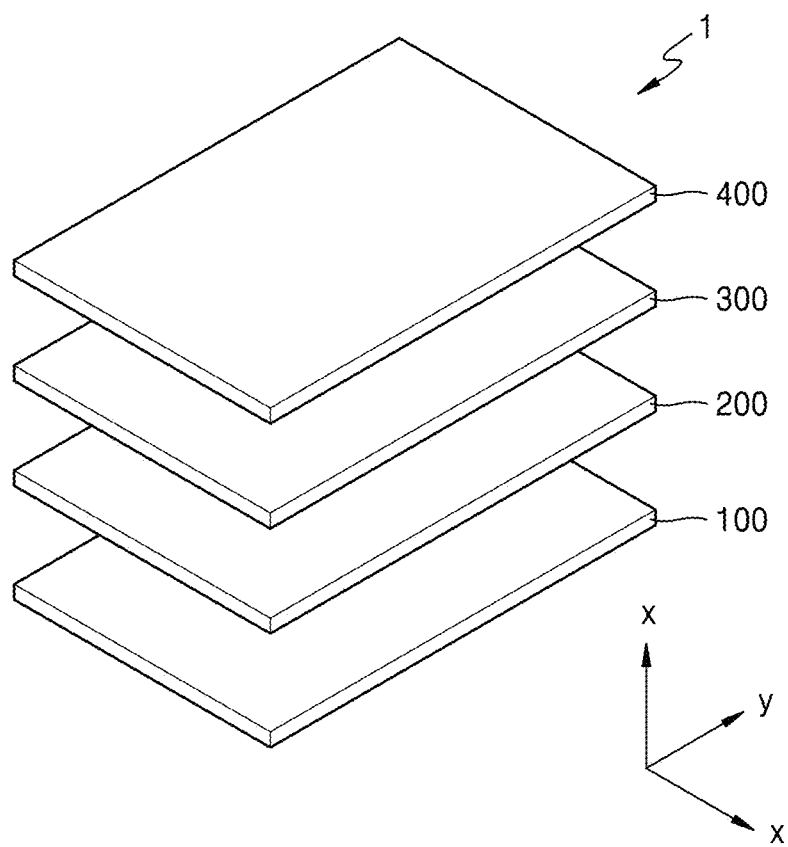
FIG. 1 is a schematic exploded perspective view of a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B." Throughout the disclosure, the expression "at least one of a, b or c" indicates only a, only b, only c, both a and b, both a and c, both b and c, all of a, b, and c, or variations thereof.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

Hereinafter, embodiments will be described in detail with reference to the accompanying drawings, and in the description with reference to the drawings, the same or corresponding constituents are indicated by the same reference numerals and redundant descriptions thereof are omitted.

In the following embodiment, it will be understood that although the terms first, second, etc. may be used herein to describe various elements, these elements should not be limited by these terms. These elements are only used to distinguish one element from another.

In the following embodiment, as used herein, the singular forms "a," "an," and "the" are intended to include the plural forms as well, unless the context clearly indicates otherwise.

In the following embodiment, it will be further understood that the terms "comprises" and "includes" (as well as their variations such as "comprising") when used in this specification, specify the presence of stated components or elements, but do not preclude the presence or addition of one or more other components or elements thereof.

In the following embodiment, it will be understood that when an element, such as a layer, a film, a region, or a plate, is referred to as being "on" another element, the element can be directly on the other element or intervening elements may be present thereon.

Sizes of elements in the drawings may be exaggerated for convenience of explanation. For example, since sizes and thicknesses of elements in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

In the following embodiment, it will be understood that when a layer, region, or component is referred to as being "connected to" another layer, region, or component, it can be directly connected to the other layer, region, or component or indirectly connected to the other layer, region, or component via intervening layers, regions, or components. For example, in the specification, when a layer, region, or component is referred to as being electrically connected to another layer, region, or component, it can be directly electrically connected to the other layer, region, or component or indirectly electrically connected to the other layer, region, or component via intervening layers, regions, or components.

FIG. 1 is a schematic exploded perspective view of a display device 1 according to an embodiment.

Referring to FIG. 1, the display device 1 may include a display panel 100, a touch unit 200 disposed on the display panel 100, a polarization unit 300 disposed on the touch unit 200, and a cover window 400 disposed on the polarization unit 300. In an embodiment, an adhesive layer may be further provided between the display panel 100 and the touch unit 200, between the touch unit 200 and the polarization unit 300, and between the polarization unit 300 and the cover window 400. Furthermore, in another embodiment, the polarization unit 300 may be provided between the display panel 100 and the touch unit 200.

According to an embodiment, the touch unit 200 may be attached, as a separate panel, on the display panel 100 using an adhesive, or provided integrally with the display panel 100 by being included in the display panel 100.

Figure 2:
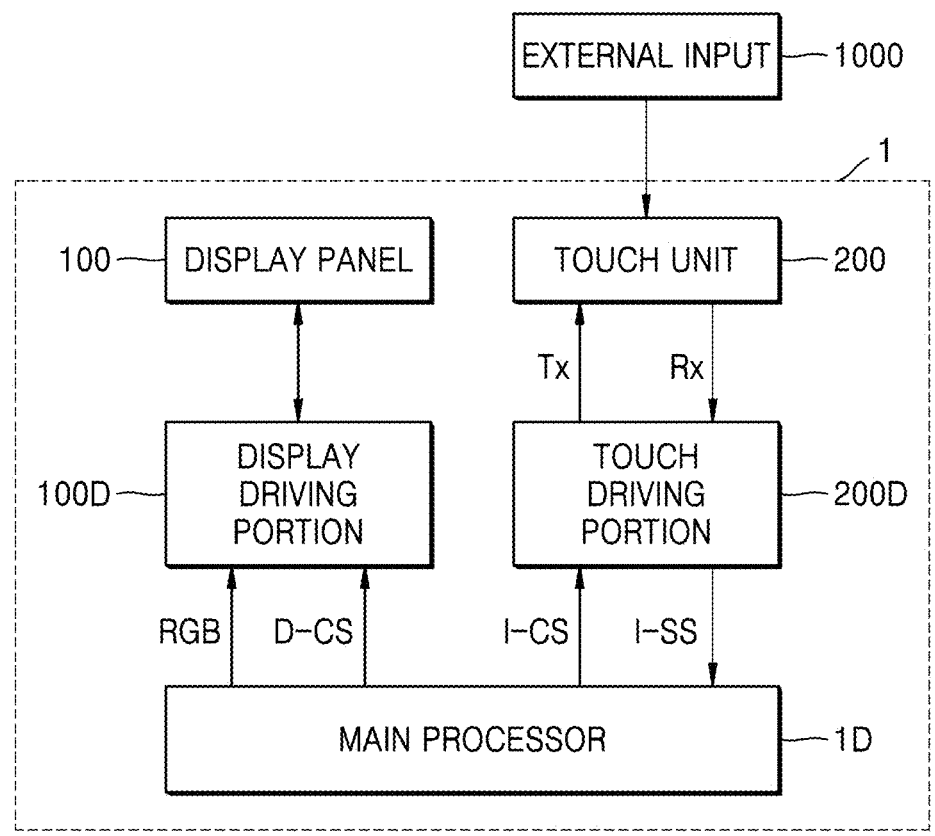
FIG. 2 is a block diagram for describing the operation of a display device according to an embodiment.

FIG. 2 is a block diagram for describing the operation of a display device according to an embodiment.

Referring to FIG. 2, the display device 1 may include the display panel 100, the touch unit 200, a display driving portion 100D, a touch driving portion 200D, and a main processor 1D.

The display panel 100 may be a configuration for substantially generating an image. The display panel 100 may include an organic light-emitting display layer, an inorganic light-emitting display layer, an organic-inorganic light-emitting display layer, a quantum-dot display layer, a micro LED display layer, or a nano LED display layer.

The touch unit 200 may be disposed on the display panel 100. The touch unit 200 may sense an external input 1000 applied from the outside. The external input 1000 may include all input devices capable of providing a capacitance change. For example, the touch unit 200 may sense an input not only by a passive type input device such as a user's body, but also by an active type input device that provides a driving signal.

The main processor 1D may control the overall operation of the display device 1. For example, the main processor 1D may control the operations of the display driving portion 100D and the touch driving portion 200D. The main processor 1D may include at least one microprocessor and further a graphics controller. The main processor 1D may be referred to as an application processor, a central processing unit, or a main driving portion.

The display driving portion 100D may drive the display panel 100. The display driving portion 100D may receive image data RGB and a control signal D-CS from the main processor 1D. The control signal D-CS may include various signals. For example, the control signal D-CS may include an input vertical synchronization signal, an input horizontal synchronization signal, a main clock, a data enable signal, and the like. The display driving portion 100D may generate a vertical synchronization signal and a horizontal synchronization signal to control a timing for providing a signal to the display panel 100, based on the control signal D-CS.

The touch driving portion 200D may drive the touch unit 200. The touch driving portion 200D may receive a control signal I-CS from the main processor 1D. The control signal I-CS may include a mode determination signal to determine the driving mode of the touch driving portion 200D and a clock signal.

The touch driving portion 200D may apply a touch driving signal Tx to the touch unit 200, in response to the control signal I-CS received from the main processor 1D. The touch driving portion 200D may apply the touch driving signal Tx having a preset driving frequency to the touch unit 200.

The touch driving portion 200D may receive a touch sensing signal Rx from the touch unit 200 and convert the received signal into a digital signal. The touch driving portion 200D may calculate coordinate information of an input based on the touch sensing signal Rx received from the touch unit 200, and provide a coordinate signal I-SS having the coordinate information to the main processor 1D. The main processor 1D may perform an operation corresponding to a user input based on the coordinate signal I-SS. For example, the main processor 1D may operate the display driving portion 100D so that a new application image is displayed on the display panel 100.

Figure 3:
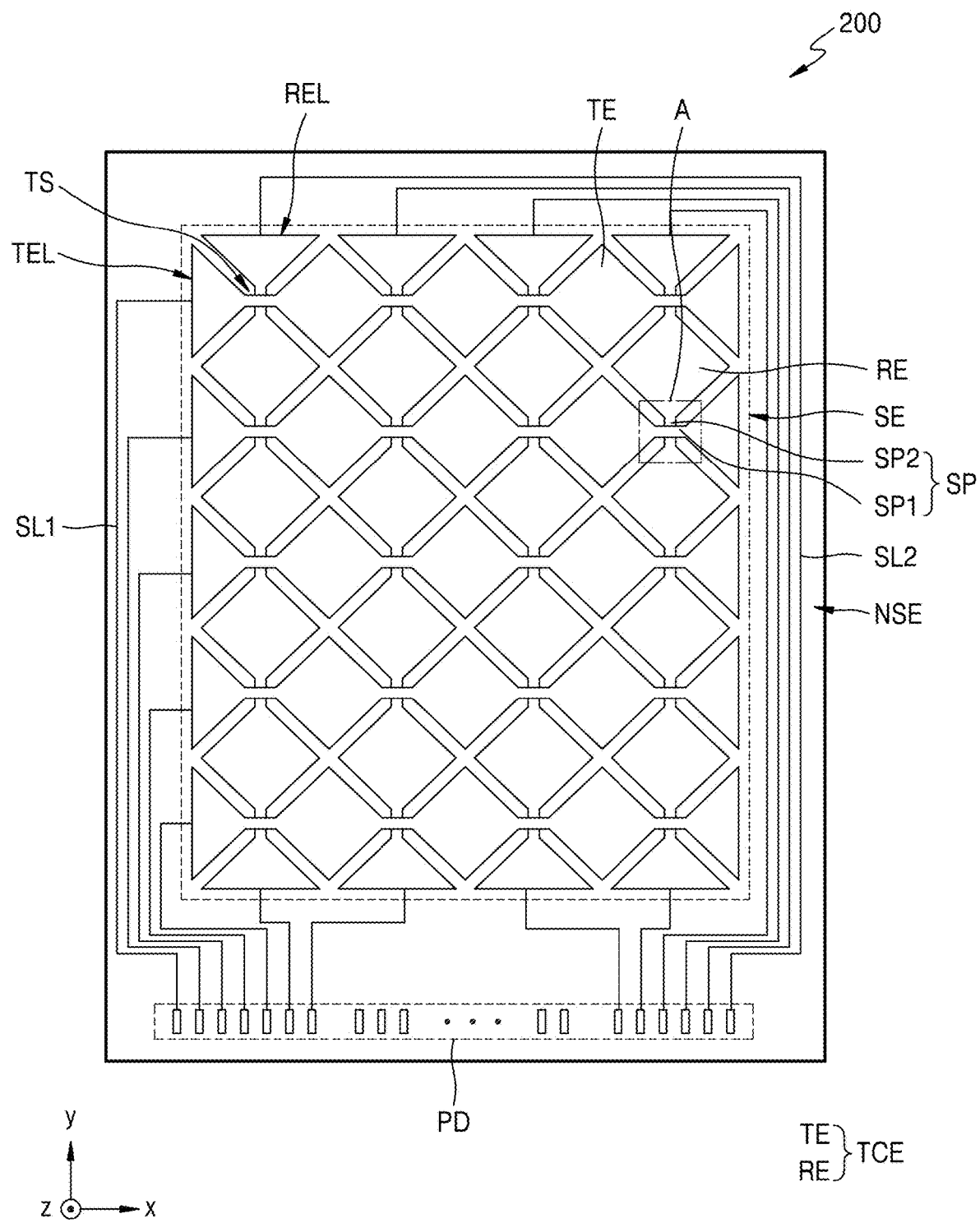
FIG. 3 is a schematic plan view of a touch unit of the display device of FIG. 1.

FIG. 3 is a schematic plan view of the touch unit 200 of the display device 1 of FIG. 1.

Referring to FIG. 3, the touch unit 200 is operated as an electrical signal is formed according to a user's touch. In an embodiment, the touch unit 200 may be of an electrostatic capacitive type. In an embodiment, the touch unit 200 may be of a mutual electrostatic capacitive type.

The touch unit 200 may include a touch sensor TS including a touch electrode TCE. The touch unit 200 may include a plurality of touch electrodes TCE. The touch electrodes TCE may be electrically connected to each other through connection patterns SP. First and second signal wires SL1 and SL2 for connecting the touch electrodes TCE to an external drive circuit through a pad portion PD may be further included in an outer area of the touch electrodes TCE.

In an embodiment, when the touch unit 200 is provided as a separate panel, the touch electrodes TCE and the connection patterns SP may be formed on a separate transparent substrate. In another embodiment, when the touch unit 200 is not provided as a separate panel, but is directly formed on the display panel 100, the touch electrodes TCE and the connection patterns SP may be formed on an encapsulation layer 30 (see FIG. 5) described below.

The touch electrodes TCE may include driving electrodes TE connected to each other in a first direction (e.g., an x-axis direction), and sensing electrodes RE connected to each other in a second direction (e.g., a y-axis direction) perpendicular to the first direction (e.g., the x-axis direction) and arranged to be distributed between the driving electrodes TE not to overlap the driving electrodes TE. The driving electrodes TE and the sensing electrodes RE may be arranged to be alternatively distributed and not to overlap each other.

The first direction (e.g., the x-axis direction) in which the driving electrodes TE are connected to each other and the second direction (e.g., the y-axis direction) in which the sensing electrodes RE are connected to each other are different directions crossing each other, and for example, when the first direction (e.g., the x-axis direction) is referred to as a row direction, the second direction (e.g., the y-axis direction) may be referred to as a column direction.

In other words, the driving electrodes TE may be arranged in plural along each row line, and the driving electrodes TE located at the row line may be formed to be connected to each other in the first direction (e.g., the x-axis direction) by first connection patterns SP1 arranged in plural along the same row line. The form of the driving electrodes TE arranged in plural and connected to each other along the same row line may be referred to as a driving electrode line TEL. For example, one driving electrode line TEL may extend in the first direction (e.g., the x-axis direction), and a plurality of driving electrode lines TEL may be arranged in the second direction (e.g., the y-axis direction). The driving electrode lines TELs may be respectively connected to the first signal wires SL1 in units of lines. The first signal wire SL1 may be a wire for transmitting the touch driving signal Tx applied from the touch driving portion 200D of FIG. 2 to the driving electrodes TE of the touch unit 200. In other words, the touch driving signal Tx may be applied to the driving electrodes TE through the first signal wires SL1.

The sensing electrodes RE may be arranged in plural along each column line, and the sensing electrodes RE located as the same column line may be formed to be connected to each other in the second direction (e.g., the y-axis direction) crossing the first direction by second connection patterns SP2 arranged in plural along the same row line or column line. The form of the sensing electrodes RE arranged in plural and connected to each other along the same column line may be referred to as a sensing electrode line REL. For example, one sensing electrode line REL may extend in the second direction (e.g., the y-axis direction), and a plurality of sensing electrode lines RELs may be arranged in the first direction (e.g., the x-axis direction). The sensing electrode lines REL may be respectively connected to the second signal wires SL2 in units of lines. The second signal wire SL2 may be a wire for transmitting the touch sensing signal Rx described with reference to FIG. 2 to the touch driving portion 200D. In other words, the touch driving portion 200D may be electrically connected to the sensing electrodes RE through the second signal wires SL2 to receive the touch sensing signal Rx from the sensing electrodes RE. The touch sensing signal Rx may be a signal in which a capacitance change amount between the driving electrodes TE and the sensing electrodes RE is reflected.

The touch electrodes TCE are implemented to be transparent to have a certain transmittance or more so as to transmit light from the display panel 100 disposed thereunder. For example, the touch electrodes TCE may include a transparent electrode layer formed of a transparent electrode material such as at least an indium tin oxide (ITO).

The connection patterns SP may include the first connection patterns SP1 formed in the first direction (e.g., the x-axis direction) and connecting the driving electrodes TE in the first direction (e.g., the x-axis direction), and the second connection patterns SP2 formed in the second direction and connecting the sensing electrodes RE in the second direction. An insulating layer for securing stability may be arranged between the first connection patterns SP1 and the second connection patterns SP2. The connection patterns SP may be formed of a transparent electrode material or an opaque low resistance electrode material, and the thickness or width thereof may be adjusted to prevent visibility.

The signal wires SL1 and SL2 are electrically and respectively connected to the driving electrodes TE and the sensing electrodes RE, in units of lines, connected in the first direction (e.g., the x-axis direction) and the second direction (e.g., the y-axis direction), and may connect the driving electrodes TE and the sensing electrodes RE to an external drive circuit such as a touch driving portion 200D described with reference to FIG. 2, through the pad portion PD. The signal wires SL1 and SL2 are located in a touch inactive region NSE defined outside the touch active region SE to avoid the touch active region SE where an image is displayed, and have a wide range of material selection so as to be formed of not only a transparent electrode material used for forming the touch electrodes TCE, but also a low resistance material such as molybdenum (Mo), silver (Ag), titanium (Ti), copper (Cu), aluminum (Al), molybdenum/aluminum/molybdenum (Mo/Al/Mo), and the like.

Although FIG. 3 illustrates an embodiment in which the first and second connection patterns SP1 and SP2 cross each other, the disclosure is not limited thereto. For example, the first connection patterns SP1 may connect the driving electrodes TE to each other in the first direction without crossing the second connection patterns SP2 by bypassing along a path overlapping the sensing electrodes RE adjacent thereto. In this case, the insulating layer for securing stability may be arranged between the first connection patterns SP1 and the sensing electrodes RE.

In the touch unit 200 configured as above, when an input device such as a finger approaches or contacts the touch unit 200, a capacitance that changes between the driving electrodes TE and the sensing electrodes RE is measured so that a touch location is detected.

The driving electrodes TE and the sensing electrodes RE may be respectively arranged in a structure in which a plurality of continuous polygons are connected in a diamond shape, but the disclosure is not limited thereto. The shapes, sizes, or arrangement forms of the driving electrodes TE and the sensing electrodes RE may be variously changed depending on the shape, size, or detection method of a display area where pixels are arranged.

Figure 4A:
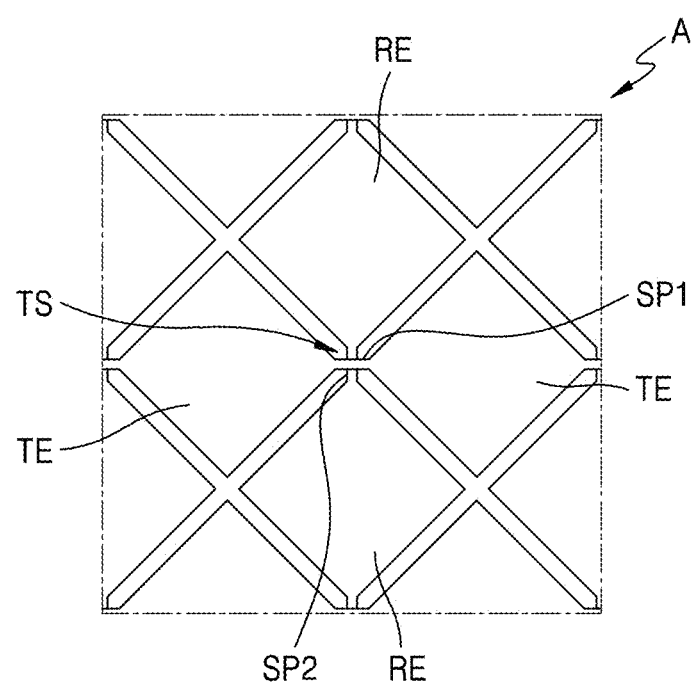
FIG. 4A is a schematic enlarged plan view of a touch sensor in a display device according to an embodiment.
Figure 4B:
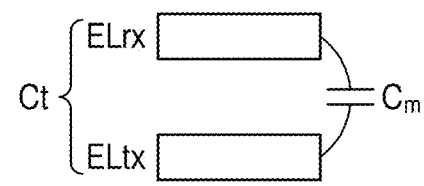
FIG. 4B is a view for describing the operation principle of a touch sensor in a display device according to an embodiment.

FIG. 4A is a schematic enlarged plan view of a touch sensor in a display device according to an embodiment. FIG. 4B is a view for describing the operation principle of a touch sensor in a display device according to an embodiment.

The touch sensor TS may correspond to a portion where the driving electrode line TEL and the sensing electrode line REL described with reference to FIG. 3 cross each other. The touch sensor TS, as illustrated in FIG. 4A, may correspond to a portion where the first connection pattern SP1 crosses the second connection pattern SP2. The touch sensor TS may correspond to a portion where the first connection pattern SP1 overlaps the second connection pattern SP2.

Referring to FIG. 4A, the driving electrodes TE may be located on the left and right of the touch sensor TS, respectively, and the sensing electrodes RE may be respectively located above and below the touch sensor TS, respectively. The touch sensor TS may detect the presence or absence of a touch through the driving electrodes TE and the sensing electrodes RE located around the touch sensor TS.

In detail, referring to FIG. 4B, the touch sensor TS may include a touch capacitor Ct. The touch capacitor Ct may include a first electrode ELtx and a second electrode ELrx. The first electrode ELtx may correspond to the driving electrodes TE located on the left and right of the touch sensor TS, respectively, and the second electrode ELrx may correspond to the sensing electrodes RE located above and below the touch sensor TS, respectively.

The touch capacitor Ct including the first electrode ELtx and the second electrode ELrx has touch capacitance Cm. The touch capacitor Ct has the touch capacitance Cm by charging electric charges between the driving electrode TE and the sensing electrode RE according to the touch driving signal Tx having a specific driving frequency. The touch capacitance Cm between the first electrode ELtx and the second electrode ELrx may be referred to as mutual capacitance. In other words, the touch capacitor Ct may have a mutual touch capacitance Cm between the driving electrode TE and the sensing electrode RE. When no touch input is applied to the display device 1, the capacitance Cm is not changed and the existing value is maintained without change. When a touch input (e.g., a finger touch) is applied to the touch sensor TS or a point adjacent thereto, a capacitance is formed between the first electrode ELtx or the second electrode ELrx, and a finger so that the capacitance Cm between the first electrode ELtx and the second electrode ELrx is changed. As such, when a certain touch input is applied to the display device 1, the capacitance Cm is changed, the touch sensor TS may detect the presence or absence of a touch using a change amount of the capacitance Cm between the first electrode ELtx and the second electrode ELrx.

In the touch unit 200, the driving frequency of the touch driving signal Tx may be determined by a method of determining a driving frequency described below with reference to FIG. 6. In an embodiment, the driving frequency of the touch driving signal Tx may be determined based on data on the touch capacitance Cm and data on the change amount of the touch capacitance Cm.

Figure 5:
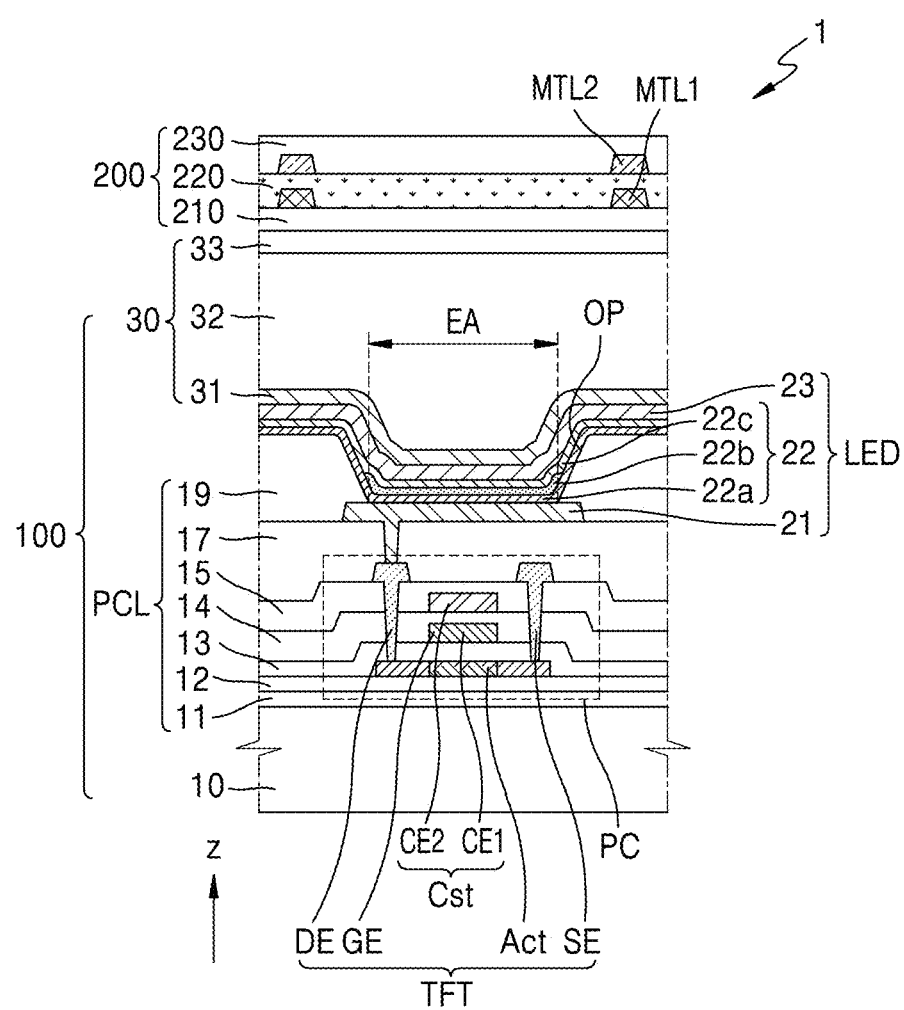
FIG. 5 is a schematic cross-sectional view of a portion of a display device according to an embodiment.

FIG. 5 is a schematic cross-sectional view of a portion of the display device 1 according to an embodiment. FIG. 5 is a cross-section of the display panel 100 of the display device 1 and the touch unit 200 on the display panel 100, described with reference to FIG. 1. Although not illustrated in FIG. 5, the display device 1 may further include the polarization unit 300 and the cover window 400 above the touch unit 200, as described with reference to FIG. 1.

Referring to FIG. 5, the display panel 100 may include a substrate 10, a pixel circuit layer PCL on the substrate 10, a light-emitting element LED on the pixel circuit layer PCL, and an encapsulation layer 30 on the light-emitting element LED.

The substrate 10 may include glass or polymer resin. The polymer resin may include polyethersulfone, polyacrylate, polyetherimide, polyethylene naphthalate, polyethylene terephthalate, polyphenylene sulfide, polyarylate, polyimide, polycarbonate, cellulose acetate propionate, or the like. The substrate 10 including polymer resin may be flexible, rollable, or bendable. The substrate 10 may have a multilayer structure including a layer including the polymer resin described above and an inorganic layer (not shown).

The pixel circuit layer PCL may include a pixel circuit PC and insulating layers, in which the pixel circuit PC includes a thin film transistor TFT and a storage capacitor Cst. The pixel circuit layer PCL may include a barrier layer 11, a buffer layer 12, a first gate insulating layer 13, a second gate insulating layer 14, an interlayer insulating layer 15, and a planarization insulating layer 17.

The buffer layer 12 may be disposed on the substrate 10, reduce or prevent infiltration of foreign materials, moisture, or external air from under the substrate 10, and provide a planarized surface to a semiconductor layer Act. The buffer layer 12 may include an inorganic material, such as oxide or nitride, an organic material, or an organic/inorganic complex, and have a single layer or multilayer structure of an inorganic material and an organic material.

The barrier layer 11 for preventing infiltration of external air may be further provided between the substrate 10 and the buffer layer 12. The barrier layer 11 and the buffer layer 12 may each include a silicon oxide ($SiO_2$) or a silicon nitride ($SiN_x$).

The pixel circuit PC including the thin film transistor TFT and the storage capacitor Cst may be disposed on the buffer layer 12. The thin film transistor TFT may include the semiconductor layer Act, a gate electrode GE, a drain electrode DE, and a source electrode SE.

The semiconductor layer Act may be disposed on the buffer layer 12 and may include polysilicon. In another embodiment, the semiconductor layer Act may include amorphous silicon. In another embodiment, the semiconductor layer Act may include an oxide of at least one material selected from among indium (In), gallium (Ga), stannum (Sn), zirconium (Zr), vanadium (V), hafnium (Hf), cadmium (Cd), germanium (Ge), chromium (Cr), Ti, and zinc (Zn). The semiconductor layer Act may include a channel region, and a source region and a drain region doped with impurities. The source region and the drain region may be arranged on opposite sides of the channel region.

The first gate insulating layer 13 may be provided to cover the semiconductor layer Act. The first gate insulating layer 13 may include an inorganic insulating material, such as $SiO_2$, $SiN_x$, a silicon oxynitride (SiON), an aluminum oxide ($Al_2O_3$), a titanium oxide ($TiO_2$), a tantalum oxide ($Ta_2O_5$), a hafnium oxide ($HfO_2$), a zinc oxide ($ZnO_2$), or the like. The first gate insulating layer 13 may be a single layer or multilayer including the inorganic insulating material described above.

The gate electrode GE may be disposed on the first gate insulating layer 13 to overlap the semiconductor layer Act.

The gate electrode GE may include Mo, Al, Cu, Ti, and the like and may be formed in a single layer or multilayer. As an example, the gate electrode GE may be a single layer of Mo.

The second gate insulating layer 14 may be provided to cover the gate electrode GE. The second gate insulating layer 14 may include an inorganic insulating material, such as $SiO_2$, $SiN_x$, SiON, $Al_2O_3$, $TiO_2$, $Ta_2O_5$, $HfO_2$, $ZnO_2$, or the like. The second gate insulating layer 14 may be a single layer or multilayer including the inorganic insulating material described above.

A second capacitor electrode CE2 of the storage capacitor Cst may be disposed on the second gate insulating layer 14. The second capacitor electrode CE2 may overlap the gate electrode GE. The gate electrode GE and the second capacitor electrode CE2 may overlap each other with the second gate insulating layer 14 therebetween, forming the storage capacitor Cst. In other words, the gate electrode GE may function as a first capacitor electrode CE1 of the storage capacitor Cst.

The second capacitor electrode CE2 may include Al, platinum (Pt), palladium (Pd), Ag, magnesium (Mg), gold (Au), nickel (Ni), neodymium (Nd), iridium (Ir), chromium (Cr), calcium (Ca), Mo, Ti, tungsten (W), or Cu, and may be a single layer or multilayer including the material described above.

The interlayer insulating layer 15 may be formed to cover the second capacitor electrode CE2. The interlayer insulating layer 15 may include $SiO_2$, $SiN_x$, SiON, $Al_2O_3$, $TiO_2$, $Ta_2O_5$, $HfO_2$, $ZnO_2$, or the like. The interlayer insulating layer 15 may be a single layer or multilayer including the inorganic insulating material described above.

The source electrode SE and the drain electrode DE may be disposed on the interlayer insulating layer 15. The source electrode SE and the drain electrode DE may include a conductive material including Mo, Al, Cu, Ti, and the like, and may be formed in a multilayer or single layer including the material described above. As an example, the source electrode SE and the drain electrode DE may each have a multilayer structure of Ti/Al/Ti. In some embodiments, the source electrode SE or the drain electrode DE may be omitted. For example, the thin film transistors TFTs adjacent to each other may share the source region or drain region of the semiconductor layer Act, and the source region or drain region may function as the source electrode SE or the drain electrode DE.

The planarization insulating layer 17 may be arranged to cover the source electrode SE and the drain electrode DE. The planarization insulating layer 17 may provide a flat base surface to a pixel electrode 21 disposed thereon.

The planarization insulating layer 17 may include an organic material or an inorganic material and may have a single layer structure or a multilayer structure. The planarization insulating layer 17 may include a general purpose polymer, such as benzocyclobutene (BCB), polyimide, hexamethyldisiloxane (HMDSO), polymethylmethacrylate (PMMA), or polystyrene (PS), a polymer derivative having a phenolic group, acrylic polymer, imide-based polymer, aryl ether-based polymer, amide-based polymer, fluorine-based polymer, p-xylene-based polymer, vinyl alcohol-based polymer, or the like. The planarization insulating layer 17 may include an inorganic insulating material, such as $SiO_2$, $SiN_x$, SiON, $Al_2O_3$, $TiO_2$, $Ta_2O_5$, $HfO_2$, $ZnO_2$, or the like. When the planarization insulating layer 17 is formed, to provide a flat upper surface after forming the planarization insulating layer 17, chemical mechanical polishing may be performed on an upper surface of the planarization insulating layer 17.

The light-emitting element LED may be disposed on the planarization insulating layer 17. The light-emitting element LED may include the pixel electrode 21, an intermediate layer 22, and a counter electrode 23.

The pixel electrode 21 may be disposed on the planarization insulating layer 17. The planarization insulating layer 17 may include a via hole for exposing any one of the source electrode SE and the drain electrode DE of the thin film transistor TFT, and the pixel electrode 21 may contact the source electrode SE or the drain electrode DE via the via hole to be electrically connected to the thin film transistor TFT.

The pixel electrode 21 may include a conductive oxide, such as ITO, an indium zinc oxide (IZO), a zinc oxide (ZnO), an indium oxide ($In_2O_3$), an indium gallium oxide (IGO), or an aluminum zinc oxide (AZO). The pixel electrode 21 may include a reflective film including Ag, Mg, Al, Pt, Pd, Au, Ni, Nd, Ir, Cr, or a compound thereof. For example, the pixel electrode 21 may have a structure including films formed of ITO, IZO, ZnO, or $In_2O_3$ above/below the reflective film described above. In this case, the pixel electrode 21 may have a stack structure of ITO/Ag/ITO.

A pixel defining layer 19 may cover the edge of the pixel electrode 21 on the planarization insulating layer 17, and may include a pixel opening OP for exposing the center portion of the pixel electrode 21. An emission area EA of the light-emitting element LED, that is, the size and shape of a pixel, is defined by the pixel opening OP.

The pixel defining layer 19 may prevent generation of arc and the like at the edge of the pixel electrode 21 by increasing the distance between the edge of the pixel electrode 21 and the counter electrode 23 above the pixel electrode 21.

The pixel defining layer 19 may be formed of an organic insulating material, such as polyimide, polyamide, acryl resin, benzocyclobutene, hexamethyldisiloxane (HMDSO), phenol resin, and the like, by a method such as spin coating and the like.

In an embodiment, the pixel defining layer 19 may further include a light blocking material. The light blocking material may include resin or paste including carbon black, carbon nanotube, or black dye, metal particles, for example, Ni, Al, Mo, and an alloy thereof, metal oxide particles (e.g., a chromium oxide), or metal nitride particles (e.g., a chromium nitride), and the like. When the pixel defining layer 19 includes a light blocking material, external light reflection by metal structures arranged below the pixel defining layer 19 may be reduced.

The intermediate layer 22 may be arranged between the pixel electrode 21 and the counter electrode 23. The intermediate layer 22 may include a first function layer 22a, an emission layer 22b, and a second function layer 22c.

The emission layer 22b formed to correspond to the pixel electrode 21 is arranged within the pixel opening OP of the pixel defining layer 19. The emission layer 22b may include a polymer material or a low molecular weight material and emit red, green, blue, or white light.

The first function layer 22a and the second function layer 22c may be respectively disposed below or above the emission layer 22b. In an embodiment, unlike the emission layer 22b being patterned and arranged for each pixel, the first function layer 22a and the second function layer 22c may be provided integrally across the entire surface of a display area.

The first function layer 22a may be a single layer or multilayer. For example, when the first function layer 22a is formed of a polymer material, the first function layer 22a, as a hole transport layer that has a single layer structure, may include poly-(3,4)-ethylene-dihydroxy thiophene (PEDOT) or polyaniline (PANI). When the first function layer 22a is formed of a low molecular weight material, the first function layer 22a may include a hole injection layer and a hole transport layer.

The second function layer 22c may be selectively provided. For example, when the first function layer 22a and the emission layer 22b are formed of a polymer material, the second function layer 22c may be formed. The second function layer 22c may be a single layer or multilayer. The second function layer 22c may include an electron transport layer or an electron injection layer. In some embodiments, at least one of a hole injection layer, a hole transport layer, an electron transport layer, and an electron injection layer may be omitted.

The counter electrode 23 may include a relatively conductive material having a low work function. For example, the counter electrode 23 may include a (semi-)transparent layer including Ag, Mg, Al, Ni, Cr, lithium (Li), Ca, an alloy thereof, or the like. Alternatively, the counter electrode 23 may further include a layer including ITO, IZO, ZnO, or $In_2O_3$ on a (semi-)transparent layer including the material described above. In an embodiment, the counter electrode 23 may include Ag and Mg.

In an embodiment, a capping layer (not shown) may be disposed on the light-emitting element LED. The capping layer may improve luminous efficiency of the light-emitting element LED based on the principle of constructive interference. The capping layer may include an organic capping layer including an organic material, an inorganic capping layer including an inorganic material, or a composite capping layer including an organic material and an inorganic material.

The encapsulation layer 30 may be disposed on the light-emitting element LED. In an embodiment, the encapsulation layer 30 may include at least one inorganic encapsulation layer and at least one organic encapsulation layer. For example, the encapsulation layer 30 may include first and second inorganic encapsulation layers 31 and 33 and an organic encapsulation layer 32 arranged therebetween.

The first and second inorganic encapsulation layers 31 and 33 may each include one or more inorganic insulating materials. The inorganic insulating material may include $Al_2O_3$, $TiO_2$, $Ta_2O_5$, $HfO_2$, ZnO, $SiO_x$, $SiN_x$, or/and SiON. The first and second inorganic encapsulation layers 31 and 33 may be formed through chemical vapor deposition.

The organic encapsulation layer 32 may further include polyethylene terephthalate, polyethylene naphthalate, polycarbonate, polyimide, polyethylene sulfonate, polyoxymethylene, polyarylate, HMDSO, acrylic resin, or a combination thereof.

The encapsulation layer 30 may include the organic encapsulation layer 32 as described above and provide a base surface that is more polarized. Accordingly, even when the components of the touch unit 200 are formed by a continuous process, a defect rate may be reduced.

The touch unit 200 may be disposed on the display panel 100. The touch unit 200 may have a multilayer structure. The touch unit 200 may include the driving electrode TE of FIG. 3, the first signal wire SL1 of FIG. 3 connected to the driving electrode TE, the sensing electrode RE of FIG. 3, the second signal wire SL2 of FIG. 3 connected to the sensing electrode RE, and at least one insulating layer. A touch sensor TS included in the touch unit 200 may detect an external input by, for example, an electrostatic capacitive method.

The touch unit 200 may include a first touch insulating layer 210, a first touch conductive layer MTL1, a second touch insulating layer 220, a second touch conductive layer MTL2, and a third touch insulating layer 230.

The first touch insulating layer 210 may be disposed directly on the encapsulation layer 30. The first touch insulating layer 210 may include an inorganic material or an organic material and may be provided in a single layer or multilayer.

The first touch insulating layer 210 may prevent damage to the encapsulation layer 30 and perform blocking of an interference signal that may be generated during driving of the touch unit 200.

For example, the first touch conductive layer MTL1 and the second touch conductive layer MTL2 may each have a single layer structure or a stacked multilayer structure. The first touch conductive layer MTL1 or the second touch conductive layer MTL2 may include a metal layer or a transparent conductive layer. The metal layer may include Mo, Ag, Ti, Cu, Al, and an alloy thereof. The transparent conductive layer may include a transparent conductive oxide, such as ITO, IZO, ZnO, an indium tin zinc oxide (ITZO), and the like. In addition, the transparent conductive layer may include conductive polymer such as PEDOT, a metal nano wire, graphene, and the like.

The conductive layer having a multilayer structure may include metal layers in a multilayer. The metal layers in a multilayer may have, for example, a three-layer structure of Ti/Al/Ti. The conductive layer having a multilayer structure may include at least one metal layer and at least one transparent conductive layer.

In another embodiment, the first touch conductive layer MTL1 and the second touch conductive layer MTL2 may each include a plurality of patterns. It may be understood that while the first touch conductive layer MTL1 may include first conductive patterns, the second touch conductive layer MTL2 may include second conductive patterns. The first conductive patterns and the second conductive patterns may form a touch sensor.

The first touch conductive layer MTL1 and the second touch conductive layer MTL2 may be electrically connected to each other through a contact hole. In an embodiment, the first touch conductive layer MTL1 and the second touch conductive layer MTL2 may each have a mesh structure so that light emitted from the light-emitting element LED may pass therethrough. In this state, the first touch conductive layer MTL1 and the second touch conductive layer MTL2 may be arranged not to overlap the emission area EA.

The second touch insulating layer 220 may include an organic material. The organic material may include at least one material selected from among acrylic resin, methacrylic resin, polyisoprene, vinyl-based resin, epoxy-based resin, urethane-based resin, cellulose-based resin, and perylene-based resin. The second touch insulating layer 220 may further include an inorganic material. The inorganic material may include at least one material selected from among $SiN_x$, an aluminum nitride (AlN), a zirconium nitride (ZrN), a titanium nitride (TiN), a hafnium nitride (HfN), a tantalum nitride (TaN), SiOx, $Al_2O_3$, $TiO_2$, a tin oxide ($SnO_2$), a cerium oxide ($CeO_2$), and SiON.

The third touch insulating layer 230 may be disposed on the second touch conductive layer MTL2. The third touch insulating layer 230 may have a single layer or multilayer structure. The third touch insulating layer 230 may include an organic material, an inorganic material, or a composite material.

In an embodiment, referring to FIGS. 3 and 5, the first touch conductive layer MTL1 may include the second connection patterns SP2 that connect the sensing electrodes RE. The second touch conductive layer MTL2 may include the sensing electrodes RE, the driving electrodes TE, and the first connection patterns SP1 connecting the driving electrodes TE. In other words, the driving electrodes TE may be connected to each other by the first connection patterns SP1 formed on the same layer, and the sensing electrodes RE may be connected to each other by the second connection patterns SP2 formed on another layer through a contact hole. In an embodiment, the driving electrodes TE and the first connection patterns SP1 may be integrally formed.

Although FIG. 5 illustrates an embodiment in which the touch unit 200 is not provided as a separate panel and is formed directly on the display panel 100, the disclosure is not limited thereto. In another embodiment, the touch unit 200 may be provided as a separate function module and coupled to the display panel 100 by an optically clear adhesive and the like.

Figure 6:
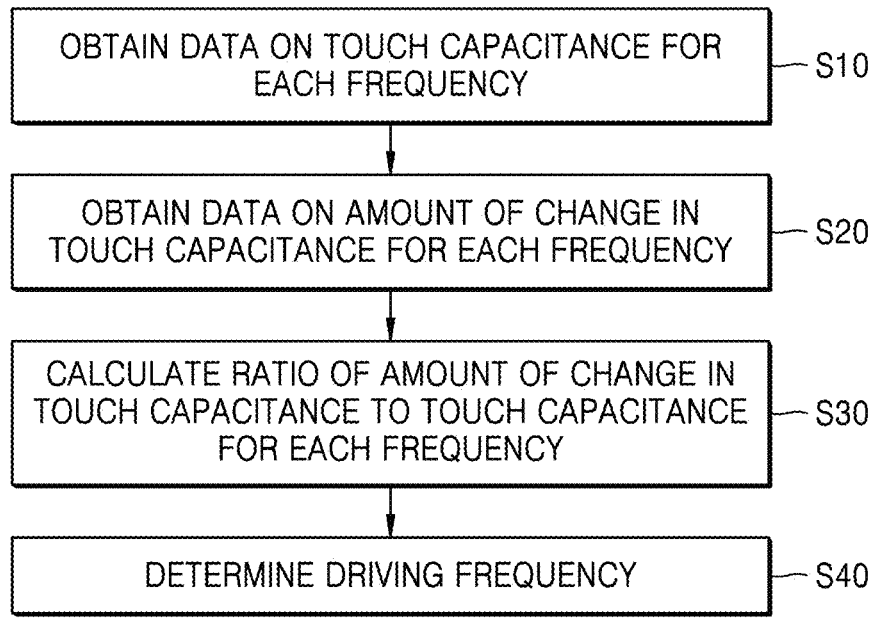
FIG. 6 is a flowchart showing a method of determining a driving frequency of a driving signal transmitted to a touch unit in a display device.

FIG. 6 is a flowchart showing a method of determining a driving frequency of a driving signal transmitted to a touch unit in a display device.

Referring to FIG. 6, the touch capacitance Cm data is obtained for each frequency (S10). The touch capacitance Cm data may be data of capacitance between the driving electrode TE and the sensing electrode RE crossing each other.

Change amount data for the touch capacitance Cm is obtained for each frequency (S20). The change amount of the touch capacitance Cm may be a change amount of the touch capacitance Cm between the driving electrode TE and the sensing electrode RE when the external input 1000 is applied to the touch unit 200.

A ratio of the change amount of the touch capacitance Cm obtained for each frequency to the touch capacitance Cm is calculated (S30).

The driving frequency of the touch driving signal Tx transmitted to the driving electrode TE is determined based on the ratio of the change amount of the touch capacitance Cm to the touch capacitance Cm according to frequencies (S40). In other words, the driving frequency may be determined based on the touch capacitance Cm and the change amount of the touch capacitance Cm. In detail, the driving frequency may be determined within a frequency range in which the ratio of the change amount of the touch capacitance Cm to the touch capacitance Cm has a value that is greater than or equal to a preset ratio. A determinable maximum value in the frequency range may be a frequency value when the ratio of the change amount of the touch capacitance Cm to the touch capacitance Cm corresponds to a preset ratio. For example, a frequency that is the same as or less than a frequency at which the ratio of the change amount of the touch capacitance Cm to the touch capacitance Cm corresponds to a preset ratio may be determined as a driving frequency. For example, the percent value of the change amount of the touch capacitance Cm to a preset touch capacitance Cm may be 8.6%. For example, the maximum frequency value at which the percent value of the change amount of the touch capacitance Cm to the touch capacitance Cm is 8.6% or more is 465 kHz, and a driving frequency range to be selected may be about 200 kHz to about 465 kHz.

The touch sensor may recognize a case when a capacitance change amount by an ambient temperature difference is excessive, as a touch, in addition to the detection of a capacitance change amount by a touch. Accordingly, as the touch sensor detects a capacitance change amount due to a temperature decrease after a touch in a low temperature environment, a ghost touch problem may arise. According to an embodiment, when the driving frequency is set within a frequency range in which the ratio of the touch capacitance Cm change amount to the touch capacitance Cm is greater than or equal to a preset ratio, the generation of the ghost touch problem after a touch in the low temperature environment may be prevented.

A method of driving the display device 1, according to an embodiment, may include determining a driving frequency according to the method of determining a driving frequency described above with reference to FIG. 6, and transmitting the touch driving signal Tx having the driving frequency to the touch unit 200. For example, the method of driving the display device 1 may include: obtaining the touch capacitance Cm data between the driving electrode TE and the sensing electrode RE in the touch unit 200, for each frequency; obtaining the touch capacitance Cm change amount data, for each frequency, when an external input is applied to the touch unit 200; determining a driving frequency of the touch driving signal Tx transmitted to the driving electrode TE, based on the touch capacitance Cm and the touch capacitance Cm data change amount; and transmitting the touch driving signal Tx having the driving frequency to the touch unit 200.

Figure 7:
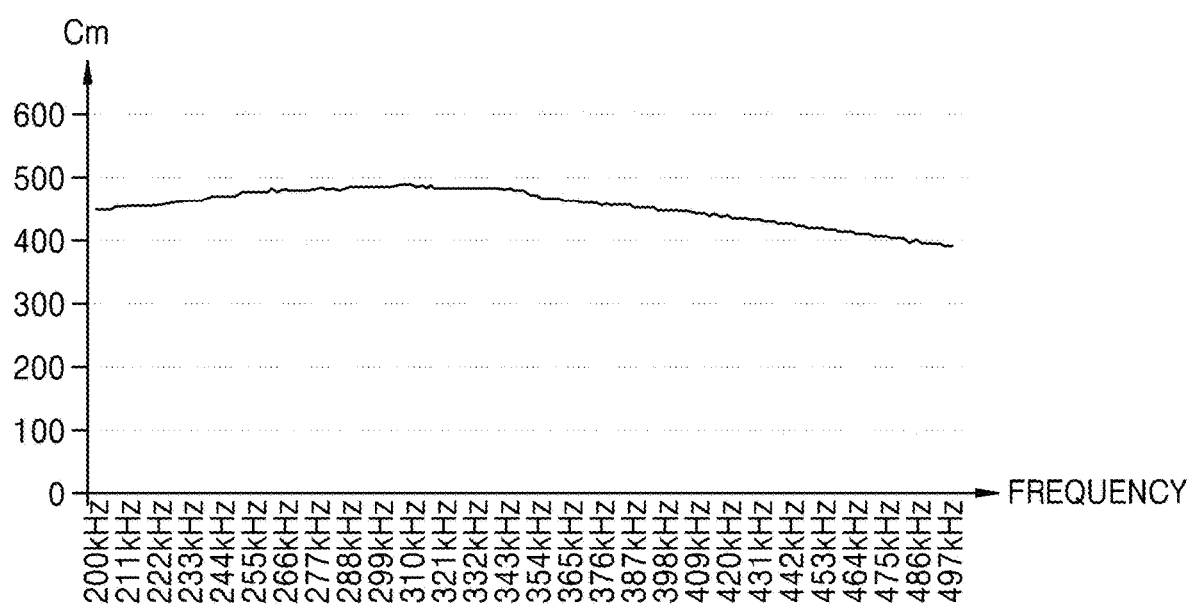
FIG. 7 is a graph showing data on touch capacitance with respect to frequency.
Figure 8:
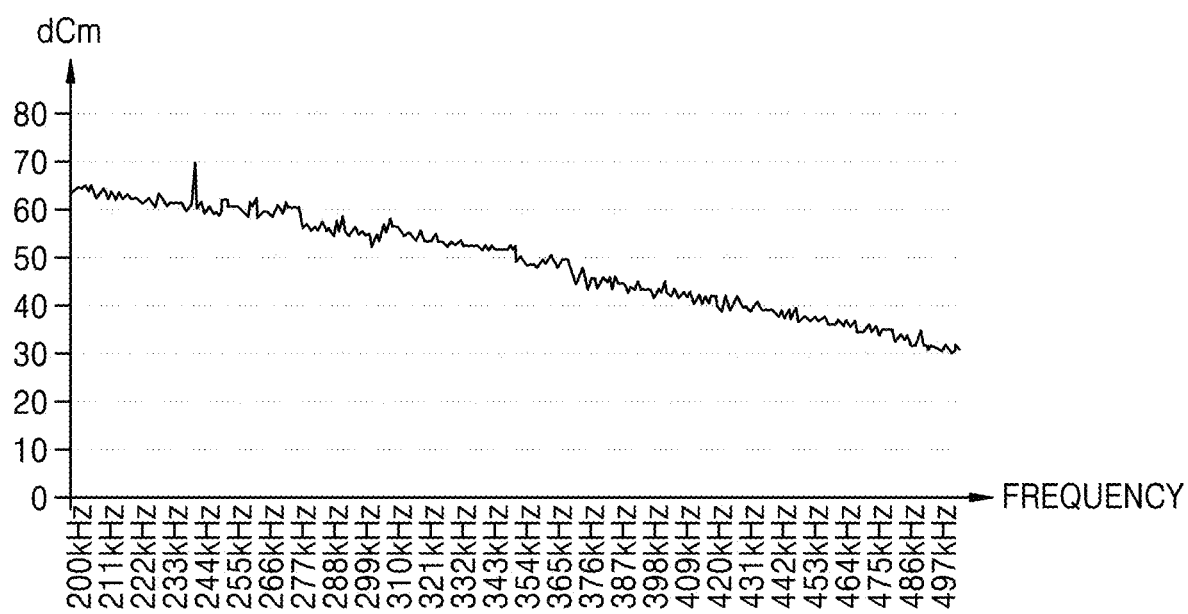
FIG. 8 is a graph showing data on the amount of change in touch capacitance with respect to frequency.
Figure 9:
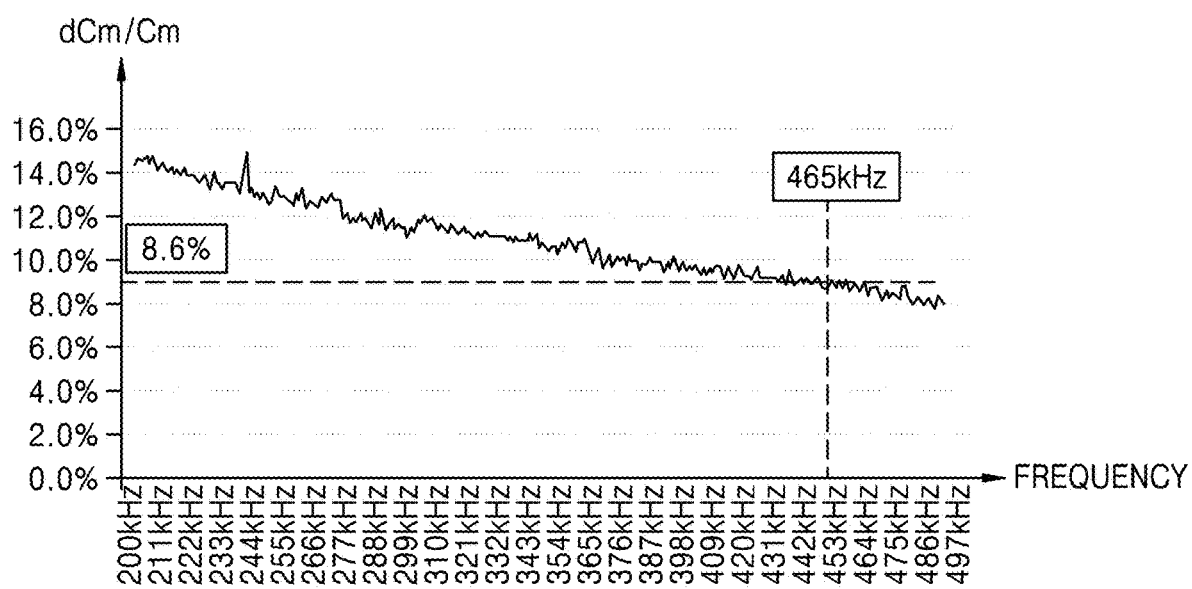
FIG. 9 is a graph showing (amount of change in touch capacitance (dCm)/touch capacitance (Cm)) with respect to frequency.

FIG. 7 is a graph showing data on touch capacitance with respect to frequency. FIG. 8 is a graph showing data on the amount of change in touch capacitance with respect to frequency. FIG. 9 is a graph showing (amount of change in touch capacitance (dCm)/touch capacitance (Cm)) to a frequency. FIGS. 7 to 9 are graphs showing data for each frequency in a touch sensor according to an embodiment. FIG. 7 shows a digital conversion value of touch capacitance according to frequencies, and FIG. 8 shows digital conversion value of a touch capacitance change according to frequencies.

In the following description, a method of determining a driving frequency of the touch driving signal Tx is described with reference to FIGS. 7 to 9.

Referring to FIGS. 7 to 9, the ratio of the amount of change in touch capacitance dCm to the touch capacitance Cm is shown by obtaining data for each frequency in a specific touch capacitor. In the touch sensor according to an embodiment, when the ratio of the amount of change in touch capacitance dCm to the touch capacitance Cm is 8.6% or more, the ghost touch phenomenon does not occur. Accordingly, the touch driving signal Tx may have a driving frequency within a frequency range in which the ratio of the amount of change in touch capacitance dCm to the touch capacitance Cm has a value of 8.6% or more. A frequency at which the ratio of the amount of change in touch capacitance dCm to the touch capacitance Cm is 8.6% is 465 kHz, which may be the maximum value of a driving frequency to be selected. Accordingly, the driving frequency may be selected within a range of 465 kHz or less. Furthermore, when the driving frequency is less than 200 kHz, the driving signal may not be smoothly transmitted so that the driving frequency may be determined within a range of about 200 kHz to about 465 kHz.

In the display device according to an embodiment, as an appropriate driving frequency is set based on the capacitance between the driving electrode and the sensing electrode and the capacitance change amount when receiving a touch, touch malfunction in a low temperature environment may be prevented. As the effect described above is an example, the scope of the disclosure is not limited by the above effects.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope as defined by the following claims.

What is claimed is:

1. A display device comprising:
    a display panel configured to display images;
    a display driving portion configured to drive the display panel;
    a touch unit disposed on the display panel and including a driving electrode and a sensing electrode;
    a touch driving portion configured to transmit a touch driving signal to the driving electrode and receive a touch sensing signal from the sensing electrode; and
    a main processor configured to control the display driving portion and the touch driving portion,
    wherein a driving frequency of the touch driving signal is determined based on an amount of change in mutual capacitance due to a touch by a user's body, with respect to base mutual capacitance between the driving electrode and the sensing electrode, and
    wherein the driving frequency is determined within a frequency range in which a ratio of the amount of change in mutual capacitance to the base mutual capacitance is greater than or equal to a preset ratio.

2. The display device of claim 1, wherein the preset ratio is 8.6%.

3. The display device of claim 2, wherein the driving frequency is about 200 kHz to about 465 kHz.

4. The display device of claim 1, wherein the driving frequency is determined as a frequency that is a same as or less than a frequency at which a ratio of the amount of change in mutual capacitance to the base mutual capacitance corresponding to a preset ratio.

5. The display device of claim 1, wherein the touch unit is of an electrostatic capacitive type.

6. The display device of claim 5, wherein the touch unit is of a mutual electrostatic capacitive type.

7. The display device of claim 1, wherein the touch driving portion is further configured to apply the touch driving signal having the driving frequency to the touch unit, in response to a control signal received from the main processor.

8. The display device of claim 1, wherein the touch driving portion is further configured to calculate coordinate information of an input, based on the touch sensing signal received from the touch unit, and provide a coordinate signal having the coordinate information to the main processor.

9. A method of determining a driving frequency of a touch driving signal in a display device comprising a display panel and a touch unit, the touch driving signal being transmitted to the touch unit, the method comprising:
    obtaining, across a range of frequencies, data on base mutual capacitance between a driving electrode and a sensing electrode, the driving electrode and the sensing electrode being included in the touch unit;
    obtaining, for each frequency, data on an amount of change in mutual capacitance when a touch by a user's body is applied to the touch unit; and determining a driving frequency of the touch driving signal, based on a ratio of the amount of change in mutual capacitance to the base mutual capacitance.

10. The method of claim 9, wherein the driving frequency is determined within a frequency range in which a ratio of the amount of change in mutual capacitance to the base mutual capacitance is greater than or equal to a preset ratio.

11. The method of claim 10, wherein the preset ratio is 8.6%.

12. The method of claim 11, wherein the driving frequency is about 200 kHz to about 465 kHz.

13. The method of claim 9, wherein the driving frequency is determined as a frequency that is a same as or less than a frequency at which the ratio of the amount of change in mutual capacitance to the base mutual capacitance corresponding to a preset ratio.

14. The method of claim 9, wherein the touch unit is of an electrostatic capacitive type.

15. The method of claim 14, wherein the touch unit is of a mutual electrostatic capacitive type.

16. A method of driving a display device, the display device comprising a display panel and a touch unit, the method comprising:
obtaining, across a range of frequencies, data on base mutual capacitance between a driving electrode and a sensing electrode, the driving electrode and the sensing electrode being included in the touch unit;
obtaining, for each frequency, data on an amount of change in mutual capacitance when a touch by a user's body is applied to the touch unit;
determining a driving frequency of a touch driving signal transmitted to the touch unit, based on a ratio of the amount of change in mutual capacitance to the base mutual capacitance; and
transmitting the touch driving signal having the driving frequency to the touch unit.

17. The method of claim 16, wherein the driving frequency is determined within a frequency range in which a ratio of the amount of change in mutual capacitance to the base mutual capacitance is greater than or equal to a preset ratio.

18. The method of claim 16, wherein the driving frequency is determined as a frequency that is a same as or less than a frequency at which a ratio of the amount of change in mutual capacitance to the base mutual capacitance corresponding to a preset ratio.

19. The method of claim 16, wherein the touch unit is of an electrostatic capacitive type.

* * * * *